United States Patent
Ishikawa et al.

(10) Patent No.: US 7,292,843 B2
(45) Date of Patent: Nov. 6, 2007

(54) FUNCTION-LIMITING DEVICE AND FUNCTION-LIMITING METHOD

(75) Inventors: Hironori Ishikawa, Yokohama (JP); Mitsuru Murata, Yokohama (JP); Toyoki Sasakura, Ashiya (JP); Kenichi Miyamoto, Tokyo (JP)

(73) Assignees: NTT DoCoMo, Inc., Tokyo (JP); Super Wave Corporation, Tokyo (JP)

( * ) Notice: Subject to any disclaimer, the term of this patent is extended or adjusted under 35 U.S.C. 154(b) by 90 days.

(21) Appl. No.: 11/109,630

(22) Filed: Apr. 20, 2005

(65) Prior Publication Data

US 2005/0250518 A1 Nov. 10, 2005

(30) Foreign Application Priority Data

Apr. 21, 2004 (JP) ............................ P2004-125984

(51) Int. Cl.
*H04Q 7/20* (2006.01)

(52) U.S. Cl. ...................... 455/411; 455/410; 455/456.1

(58) Field of Classification Search ................. 455/421, 455/418, 419–420, 41.2, 410–411, 456.5, 455/433, 560, 404.1, 404.2, 412.2, 414.1, 455/414.2, 440, 441, 456.1, 456.2, 456.6, 455/567, 403, 550.1; 340/539.1, 539.11, 340/539.13–539.16, 539.23, 539.32
See application file for complete search history.

(56) References Cited

U.S. PATENT DOCUMENTS 6,956,480 B2 * 10/2005 Jespersen ................. 340/568.1

| | | |
|---|---|---|
| 2002/0137524 A1 | 9/2002 | Bade et al. |
| 2003/0073448 A1 | 4/2003 | Ozeki et al. |
| 2003/0083044 A1 | 5/2003 | Schreyer et al. |

FOREIGN PATENT DOCUMENTS

| | | | |
|---|---|---|---|
| EP | 1 164 555 A2 | | 12/2001 |
| GB | 2391430 A | * | 2/2004 |
| JP | 11-298600 | | 10/1999 |
| JP | 2001-326967 | | 11/2001 |
| JP | 2002-57789 | | 2/2002 |
| JP | 2002-77433 | | 3/2002 |
| JP | 2002-271850 | | 9/2002 |
| JP | 2002-345033 | | 11/2002 |
| WO | WO 00/62574 | | 10/2000 |

* cited by examiner

*Primary Examiner*—Jean Gelin
(74) *Attorney, Agent, or Firm*—Oblon, Spivak, McClelland, Maier & Neustadt, P.C.

(57) ABSTRACT

Non-reception-controlled area information is stored in the non-reception-controlled area storage section of the reception control device for each mobile device ID. When the reception control device receives the disconnection signal and position information from the mobile device in accordance with the mobile device moving away from the key terminal, the presence/absence determination section determines whether or not the mobile device is within the aforementioned area. As a result of the determination, if the current position of the mobile device is within the aforementioned area, control for enabling reception for the mobile device is performed, and if the current position is outside the aforementioned area, control for disabling reception for the mobile device is performed.

6 Claims, 6 Drawing Sheets

MOBILE DEVICE ID 1234 (11a)

| PREVIOUSLY SET POSITIONS (11b) | POSITION ATTRIBUTES (11c) | PERMITTED RANGE (11d) |
|---|---|---|
| N36.14.63.4  E135.16.44.8 | HOME | 50M RADIUS |
| N36.12.66.5  E135.17.45.6 | COMPANY (WORKPLACE) | 50M RADIUS |
| N36.12.62.8  E135.17.49.2 | PARENT'S HOME | 50M RADIUS |
| ⋮ | ⋮ | ⋮ |

(b)

MOBILE DEVICE ID 1234 (11a)

| PREVIOUSLY SET POSITIONS (BASE STATION IDS) (11e) | POSITION ATTRIBUTES (11f) | PERMITTED RANGE (11g) |
|---|---|---|
| 1523 | HOME | WITHIN BASE STATION AREA |
| 2351 | FACTORY | WITHIN ADJACENT BASE STATION AREA |
| 3145 | COMPANY (WORKPLACE) | WITHIN BASE STATION AREA |
| ⋮ | ⋮ | ⋮ |

Fig.4
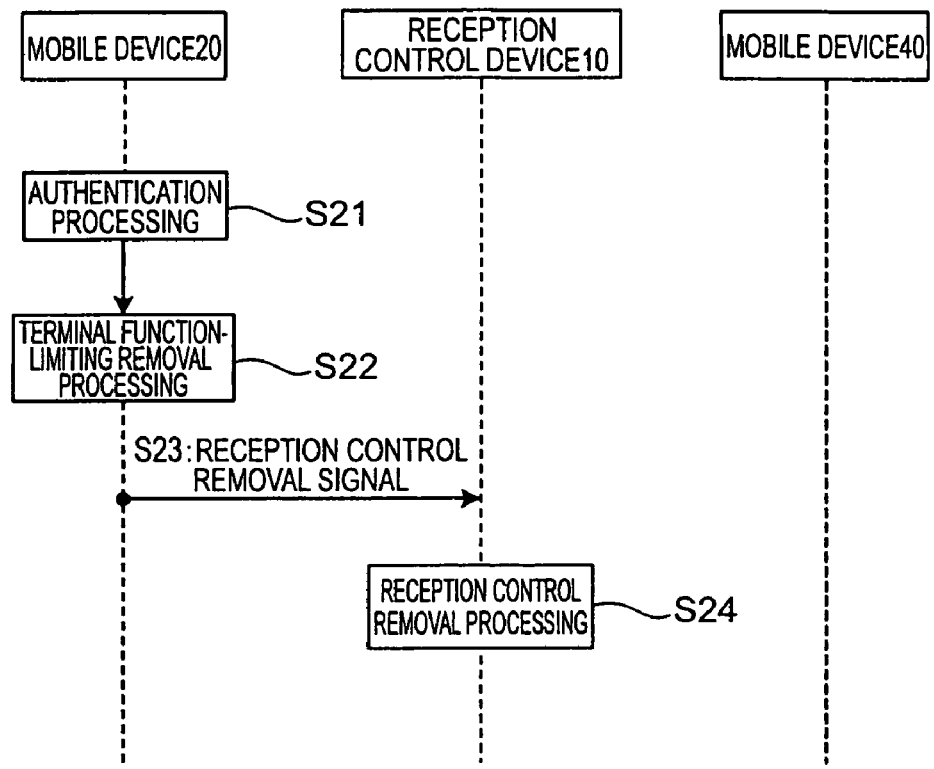
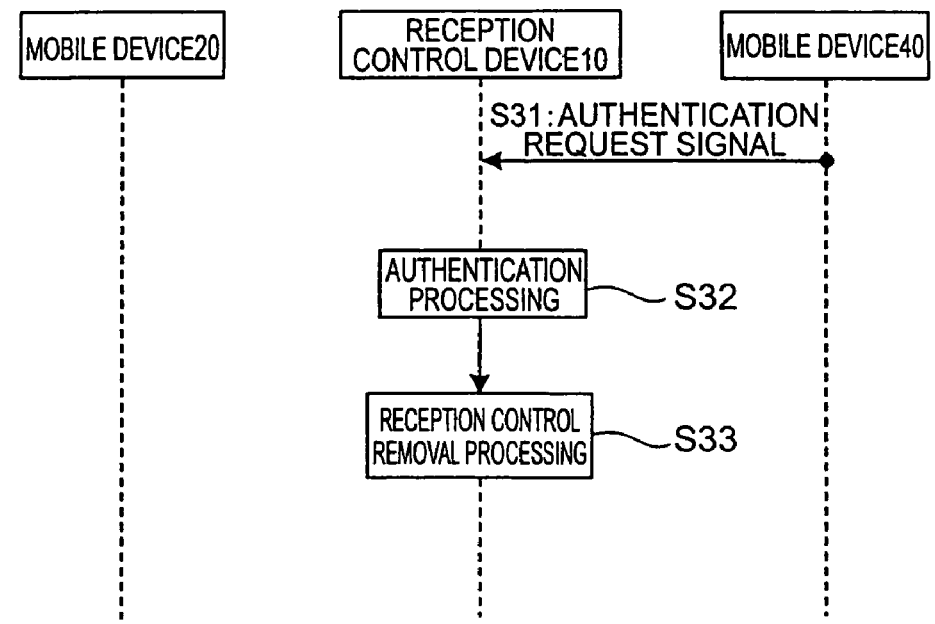

FUNCTION-LIMITING DEVICE AND FUNCTION-LIMITING METHOD

BACKGROUND OF THE INVENTION

1. Field of the Invention

The present invention relates to technology for the limiting of functions of mobile devices such as mobile phones.

2. Related Background Art

In association with an increasing level of functionality, mobile devices including mobile phones have recently also been employed in the transfer of electronic money and electronic tickets. Under these conditions, theft or loss of the mobile device becomes an extremely serious matter. In order to resolve these problems, a technology has been disclosed to control reception by limiting functions of the mobile device from another communication means, as in, for example, Japanese Patent Application Laid-open No. 2001-326967 and Japanese Patent Application Laid-open No. H11-298600, when it becomes lost. Details of limiting of function are, for example, the setting of valid/invalid key operation, ring tone on/off, and setting the call destination.

SUMMARY OF THE INVENTION

However, since the aforementioned technology requires the user of a mobile device to manually specify the details for control of reception, the aforementioned reception control function is not realized unless this specification and setting is done beforehand. With the foregoing difficulty in view, the reception control details are registered in the reception control device, and immediately the mobile device detects disconnection from the communications terminal (key terminal), the notified reception control device controls reception for the aforementioned mobile device to effectively prevent unauthorized use associated with its loss.

However, with such reception control, reception control is conducted irrespective of the situation when the mobile device is separated from the communications terminal. Thus, reception is controlled in locations where theft or loss does not normally occur (for example, the home or workplace at company), and as a result, there is the possibility that the user or caller will be unable to use the desired functions of the mobile device. This is undesirable in terms of improving the convenience of the mobile device itself, and of the entire communications system. If, for example, it becomes necessary to search for a mobile device within the home, if both reception and the ring tone are enabled, time is required to find the mobile device since these functions are limited, even though the mobile device can be readily found with the ring tone Here, the theme of the present invention is the prevention of unauthorized use by a third party in the event of the mobile device being stolen or lost. Furthermore, by reception control in response to the current position of the mobile device, the legitimate user can rapidly find the mobile device while preventing its unauthorized use by a third party.

The function-limiting device according to the present invention comprises receiving means to receive a signal sent from a mobile device when signals sent from a communications terminal are not received within a prescribed time, and function-limiting means to limit functions related to the mobile device when the signal is received by the receiving means.

The function-limiting method according to the present invention includes a receiving step receiving a signal sent from a mobile device when signals sent from a communications terminal are not received within a prescribed time, and a function-limiting step limiting functions related to the mobile device when the signal is received in the receiving step.

The fact that the mobile device has not received the signal sent from the communications terminal within the prescribed time can be employed to estimate that the mobile device is separated from the communications terminal by a distance equal to or greater than the prescribed distance. Furthermore, there is a high probability of the mobile device being stolen or lost (including being left behind) when the mobile device is separated from the communications terminal. According to these inventions, when there is a high probability of the mobile device having been stolen or lost, the function-limiting device detects this fact by reception of the signal. Thus, the function-limiting device can provide the required limiting of functions for the mobile device, and can prevent unauthorized use by thieves or persons finding it.

It is desirable that the function-limiting device according to the present invention further comprises storing means to store an area where reception is not controlled for the mobile device even when signals sent from the communications terminal are not received within the prescribed time in association with identification information of the mobile device; wherein the receiving means receives position information indicating the current position of the mobile device together with a disconnection signal, the function-limiting device further comprises presence/absence determining means to determine whether or not the current position indicated by the position information received by the receiving means is within the area previously stored in the storing means, when reception for the mobile device is detected; and when the presence/absence determining means determines that the current position is within the area, the function-limiting means enables reception for the mobile device, and when the presence/absence determining means determines that the current position is outside the area, the function-limiting means disables reception for the mobile device.

According to the present invention, locations of the mobile device in which theft or loss does not normally occur (for example, the home or workplace at company), are pre-registered in the function-limiting device, and the reception control function is removed, in other words, reception is enabled when it is predicted that the mobile device is in these locations. Therefore, even when the user needs to search for the mobile device in the home, it can be readily found with the ring tone. As a result, convenience is improved. Thus, the function-limiting device conducts reception control in response to the current position of the mobile device, and the legitimate user can rapidly find the mobile device while preventing its unauthorized use by a third party.

The function-limiting device according to the present invention is further comprised of movement determining means to determine whether or not the mobile device is moving, based on changes over time in the position information received by the receiving means; wherein, when the movement determining means determines that the mobile device is moving, the function-limiting means disables all reception for the mobile device, and when the mobile device is determined to be stationary, the function-limiting means enables only reception for the mobile device from a previously registered call source (for example, phone number, e-mail address).

When the position of the mobile device sending the disconnection signal changes, it is determined to have separated from the hand of the holder, that is to say, the user, and there is therefore a high probability that it has been stolen. On the other hand, when the position of the mobile device does not change, the mobile device is stationary in one location, and there is therefore a high probability that it has been lost (including being left behind). According to the present invention, since the function-limiting device acquires the current position information for the mobile device a plurality of times, based on this history, it is able to determine whether separation of the mobile device from the hand of the user is due to theft or to being lost. When theft is determined, all reception for the mobile device is disabled to prevent unauthorized use. On the other hand, when loss is determined, since the danger of unauthorized use is low, reception from a specific call source is enabled. Thus, by appropriately changing the details of reception control in response to movement or not of the mobile device, unauthorized use in the case of theft is prevented while facilitating ready discovery of the mobile device.

Based on the received current position information, the function-limiting device is able to successively determine the position of the mobile device. Therefore, if the function-limiting device uses other mobile devices and communications devices to notify the mobile device user of the position, the user can determine the position of the stolen or lost mobile device. As a result, it can be found rapidly.

It is desirable that the function-limiting device according to the present invention comprises authenticating means to authenticate the mobile device when a signal to remove function-limitation sent from another mobile device (the mobile device of another person) is received; and removing means to remove function-limitation related to the mobile device (own mobile device) when a signal to remove function-limitation sent from the mobile device (own mobile device) is received, or when a signal to remove function-limitation sent from the other mobile device is received and the authentication processing for the mobile device (the mobile device of another person) has been performed by the authenticating means.

According to the present invention, function-limitation related to a mobile device set as valid can be removed by either the legitimate user of the mobile device, or by another user recognized as legitimate with user authentication processing using the function-limiting device. Thus, inconvenience to the user or caller in association with limiting of functions when execution of functions is desired is reduced.

According to the present invention, unauthorized use by a third party when a mobile device is stolen or lost can be prevented. Furthermore, since reception control is conducted in response to the current position of the mobile device, the legitimate user can rapidly find the mobile device while preventing its unauthorized use by a third party.

BRIEF DESCRIPTION OF THE DRAWINGS

FIG. 2 is a diagram showing an example of the configuration of the storage section;

FIG. 2(a) is a diagram showing an example of the configuration of the non-reception-controlled area storage section;

FIG. 2(b) is a diagram showing another example of the configuration of the non-reception-controlled area storage section;

FIG. 4 is a flowchart describing operation of the reception control device;

FIG. 4(a) is a flowchart describing processing for removing the reception control function from the called mobile device;

FIG. 4(b) is a flowchart describing processing for removing the reception control function from the calling mobile device;

DESCRIPTION OF THE PREFERRED EMBODIMENTS

First Embodiment

Figure 1:
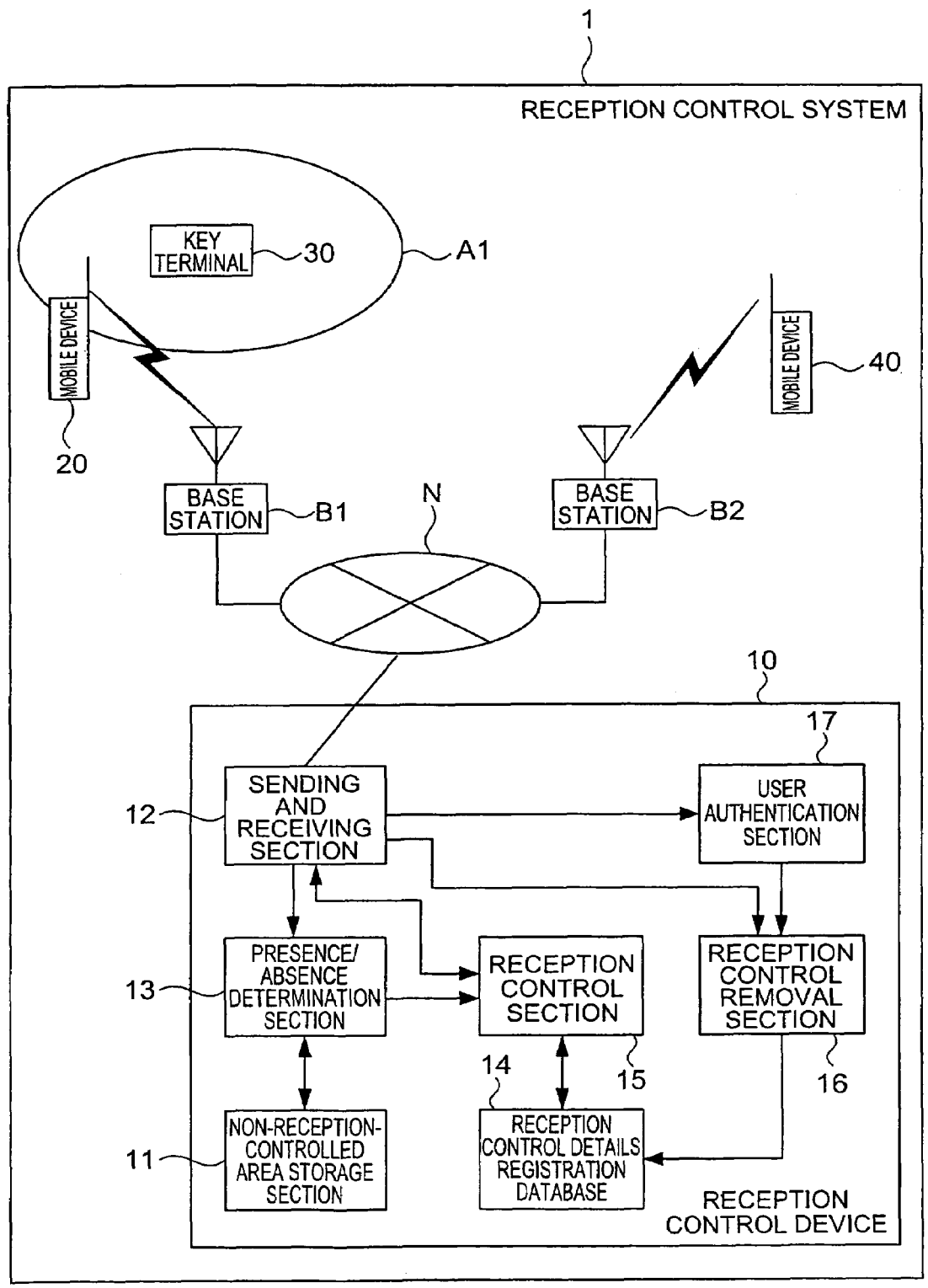
FIG. 1 is a block diagram showing the functional configuration of the reception control device in the first embodiment of the present invention.

The first embodiment of the present invention is described below in reference to the figures attached for purposes of illustration. Firstly, the configuration of the reception control system 1 in the present embodiment is described. As shown in FIG. 1, the reception control system 1 has a reception control device 10 (corresponding to the function-limiting device), a mobile device 20, a key terminal 30 (corresponding to the communications terminal), and a mobile device 40. The reception control device 10 is connected to the mobile device 20 via a base station B1, and to the mobile device 40 via a base station B2. Thus, data communications and voice communications are possible between the mobile device 20 and the mobile device 40 via a mobile communications network N. Furthermore, when the mobile device 20 is within the prescribed communications range, the key terminal 30 is able to conduct short-range wireless communication with the mobile device 20.

The various elements of the reception control system 1 are described in detail below.

The functional elements of the reception control device 10 a non-reception-controlled area storage section 11 (corresponding to the storing means), a sending and receiving section 12 (corresponding to the receiving means), a presence/absence determination section 13 (corresponding to the presence/absence determining means), a reception control details registration database (DB) 14, a reception control section 15 (corresponding to the function-limiting means), a reception control removal section 16 (corresponding to the removing means), and a user authentication section 17 (corresponding to the authenticating means). These sections are connected via a bus.

Even when the disconnection signal is sent from the mobile device 20, information indicating the geographical area in which reception control is not conducted is matched to the ID of the mobile device 20 and stored in the non-reception-controlled area storage section 11. FIG. 2(a) shows an example of data storage in the non-reception-controlled area storage section 11. As shown in FIG. 2(a), the non-reception-controlled area storage section 11 has the mobile device ID area 11a in which the mobile device identification information is stored, and data areas 11b, 11c, and 11d in which the non-applicable area information for reception control is stored.

For example, '1234' is stored in the mobile device ID area 11a as the mobile device 20 ID.

The position information previously set by the mobile device 20 user (for example, 'N36.14.63.4, E135.16.44.8') is stored in the previously set position area 11b as the area information. Furthermore, information indicating the attributes of that position (for example, 'home') are stored in the position attribute area 11c, and the permitted range (for example, 'radius 50 m') centered on the previously set position is stored in the permitted range area 11d. A plurality of area information can be registered for one mobile device ID, and can be updated (including addition and deletion) by the user.

Areas in which reception control for that mobile device is not conducted are determined in association with the identification of the mobile device by the registered details of the non-reception-controlled area storage section 11. For example, when the home of the mobile device 20 user is at the position 'N36.14.63.4, E135.16.44.8', the reception control function is removed in the area within a radius of 50 m of that point, in other words, within the home or in close proximity to the home. Or, when the position of the mobile device 20 user's desk at the workplace at the company is 'N36.12.66.5, E135.17.45.6'), the reception control function is removed in the area with a radius of 10 m of that point, in other words, at the work desk or in close proximity to the work desk.

The position at which the base station is installed can also be used in setting the non-reception-controlled area. The internal configuration of the non-reception-controlled area storage section 11 in the case in which the position of the base station is used is shown in FIG. 2(b). In this case, the non-reception-controlled area storage section 11 has a previously set position area 11e, a position attribute area 11f, and an permitted range area 11g, matched to the mobile device ID. The base station ID (for example, '1523', '2351') for which the installation position is fixed is stored as the area for which the position has been previously set in the previously set position area 11e, and the corresponding position attribute (for example, 'home', 'factory') is stored in the position attribute area 11f. Furthermore, information showing the geographical range over which reception control is removed (for example, 'within base station area', 'within adjacent base station area') is stored in the permitted range area 11g as the permitted range. Thus, the area information associated with identification of the mobile device can be identified.

The sending and receiving section 12 receives the disconnection signal sent from the mobile device 20 and the position information indicating the current position of the mobile device 20 via the base station B1 and the mobile communications network N. Furthermore, when the sending and receiving section 12 receives the call signal from the mobile device 40 via the base station B2 and the mobile communications network N, the call signal is transferred, or the answer-phone responds, in response to whether or not the caller has been set for reception.

When reception for the mobile device 20 is detected, the presence/absence determination section 13 determines whether or not the current position indicating the position information of the mobile device 20 is within the area corresponding to the mobile device 20 in the non-reception-controlled area storage section 11.

The reception control details are previously registered in the reception control details registration database 14 for each mobile device ID. The reception control details can also be, for example, a combination of reception control based on reception control type, reception control in response to the call source, and reception notification method control.

Reception control based on reception control type is, for example, reception of only voice calls or e-mail. Reception control in response to call source is, for example, reception of only previously registered call sources, or reception of only calls from public phones. Reception notification method control is, for example, the presence or absence of the ring tone, or presence or absence of the call display. The reception details in the reception control details registration database 14 can be updated provided an instruction is received from a mobile device having privileges.

The reception control section 15 references the reception control details registration database 14 and controls reception in response to control details related to the calling mobile device (for example, mobile device 20). For example, when the current position of the mobile device 20 is determined by the reception control section 15 as being within the non-reception-controlled area, reception for the mobile device 20 is enabled without reference to the registered details in the reception control details registration database 14. On the other hand, when the current position of the mobile device 20 is determined as being outside the non-reception-controlled area, reception for the mobile device 20 is disabled without reference to the registered details in the reception control details registration database 14.

When the reception control removal signal (corresponding to the function-limiting removal signal) from the mobile device 20 is sent, the reception control removal section 16 removes reception control for the mobile device 20. Furthermore, when the reception control removal signal is sent from the mobile device 40, the reception control removal section 16 removes reception control for the mobile device 20 provided the mobile device 40 is successfully authenticated.

When a mobile device for which reception control has been removed differs from the mobile device for which reception control is to be removed, the user authentication section 17 authenticates the latter. For example, when the reception control removal signal for the mobile device 20 is sent from the mobile device 40, the user is authenticated for the mobile device 40. Any desired method of authentication, for example, commonly used voice recognition and biometric authentication technologies, can be applied. Furthermore, the combined use of personal identification numbers can further increase security, reliably preventing removal of reception control by an unauthorized third party.

The mobile device 20 communicates with other mobile devices (for example, mobile device 40) and servers (for example, reception control device 10) connected to the mobile communications network N via the base station B1. Furthermore, the mobile device 20 can communicate with the key terminal 30 using a short-range wireless communication network such as Bluetooth (registered trademark). The mobile device 20 is, for example, a mobile phone or a PHS (Personal Handy phone System), however, if it is a mobile terminal having a communications function, it is not limited by this function and application.

The key terminal 30 is a terminal device having a short-range wireless communication function. The key terminal 30 is matched to the mobile device 20 using a bidirectional ID, and conducts short-range wireless communication with the mobile device 20 within the coverage area A1 of the transmissions (for example, a radius of 3 m). In other words, when the terminal key terminal 30 receives the mobile device ID periodically sent from the mobile device 20, and the key terminal ID send request signal, and returns its own terminal ID (key terminal ID) to the mobile device 20. The mobile device 20 therefore detects its separation from the key terminal 30 by the fact that the key terminal ID is not received for the prescribed time.

If the mobile device 20 user constantly carries the key terminal 30, when the mobile device 20 is separated from the key terminal 30, it is possible to predict that the mobile device 20 has been stolen or lost. The key terminal 30 can be of any shape such as a pendant, card, key, or pin and the like, however, it is desirable that it be small and integrated so that it is readily carried by the mobile device 20 user.

The mobile device 40 communicates with the mobile device 20 connected to the mobile communications network N, and the reception control device 10, via the base station B2. The mobile device 40 sends the call signal for the mobile device 20 to the reception control device 10, and receives the response signal in response to reception for the mobile device 20 being enabled or disabled.

Operation of the reception system 1 in the present embodiment, and the various steps comprising the function-limiting method according to the present invention, are described below in reference to FIG. 3.

Firstly, when power is switched on, the mobile device 20 ID and the key terminal 30 ID send request signal are sent from the mobile device 20 at fixed intervals T1 (for example, between three and four minutes) (S1). The mobile device 20 ID and the key terminal 30 ID send request signal sent in this manner are received by the key terminal 30 via a short-range wireless circuit.

When the mobile device 20 ID and the key terminal 30 ID send request signal are received by the key terminal 30, the key terminal 30 ID is sent from the key terminal 30. The key terminal 30 ID sent in this manner is received by the mobile device 20 (S2).

Simultaneously with commencing sending of its own ID and the ID send request to the key terminal 30, the mobile device 20 commences a count with a timer. If the ID is not received from the key terminal 30 within a fixed interval T2 (for example, five minutes) after sending the aforementioned ID and send request, the mobile device 20 detects time-out (S3:YES).

When the mobile device 20 detects time-out, part of its functions are limited with the terminal function-limiting function (S4). In practice, the mobile device 20 suspends the key input function, the display function, the individual data display function for, for example, address books, the function for access to IC chips in which electronic money and credit card information is recorded, the call function, the function for communication with parties other than specific parties (for example, position recording device), and specific functions previously set by the user such as limits on access to UIMs (User Identity Module). Thus, thieves or persons finding the mobile device 20 are temporarily prevented from using it or viewing data stored in it.

When processing to limit functions is complete, the mobile device 20 measures its own current position with a commonly used GPS (Global Positioning System) function, and acquires position information (S5). This position information is sent, together with a signal notifying interruption of communications with the key terminal 30 (disconnection, signal), to the reception control device 10 as the preset destination. The reception control device 10 receives a disconnection signal and the position information with the sending and receiving section 12 (S6).

When the mobile device 20 is separated from the key terminal 30 by a distance equal to or greater than a fixed distance (for example, approximately 3 m), the signal sent from the key terminal 30 is attenuated, and the signal can no longer be received by the mobile device 20. In other words, when the mobile device 20 cannot receive the signal, there is a high probability of the mobile device 20 being separated from the key terminal 30 by a distance equal to or greater than a fixed distance. In other words, the probability of the mobile device 20 being stolen or lost is high. In this case therefore, the mobile device 20 notifies the reception control device 10 of this fact (the high probability of the mobile device 20 having being stolen or lost) with the aforementioned disconnection signal.

The reception control device 10 commences the processing in S7 and later when the aforementioned disconnection signal is received. In other words, the reception control device 10 references the non-reception-controlled area storage section 11 with the presence/absence determination section 13, and determines whether or not the position indicating the mobile device 20 position information received simultaneously with a disconnection signal is within the non-reception-controlled area. The result of the determination is output from the presence/absence determination section 13 to the reception control section 15, and the reception control section 15 enables or disables reception in response to this result (S7). In practice, when the position indicating the position information of the mobile device 20 is a position within the non-reception-controlled area, the reception control section 15 permits reception by enabling reception for the mobile device 20. On the other hand, when the position indicating the position information of the mobile device 20 is not a position within the non-reception-controlled area, the reception control section 15 prevents reception by disabling reception for the mobile device 20. The enabled or disabled setting is registered in the reception control details registration database 14.

When a call is subsequently received for the mobile device 20, the processing in S8 and later is executed. For example, when the user of mobile device 40 calls the mobile device 20, the call signal is sent from the mobile device 40 to the reception control device 10 via base station B2 (S8). When the reception control device 10 receives the call signal with the sending and receiving section 12, reception in relation to the call destination (mobile device 20 in the present embodiment) is verified as being enabled or disabled with the reception control section 15 (S9).

When reception for the mobile device 20 is set to 'enabled' (S9:YES), the reception control device 10 transfers the call signal received in S8 to the mobile device 20 (S10) being the call destination. The mobile device 20 receiving the call signal receives the call within the function range of the mobile device 20 limited in S4, and receives the call (S11).

When reception for the mobile device 20 is set to 'disabled' (S9:NO), the reception control device 10 moves to the processing in S12 without transferring the call signal received in S8 to the call destination. In S12, the reception control device 10 conducts processing to send a message notifying the mobile device 40 that reception is currently not possible. For example, when the mobile device 20 is subscribed to an answer-phone service, an audio message such as 'Thank you for calling, I am currently unavailable, please leave a message' is played and reception is disabled. In this case, the reception control device 10 may notify only users verified as legitimate using the prescribed authentication processing for the position information received in S6. Thus, even when the mobile device 20 is outside the non-reception-controlled area, it is possible to determine the location of the mobile device 20.

Figure 3:
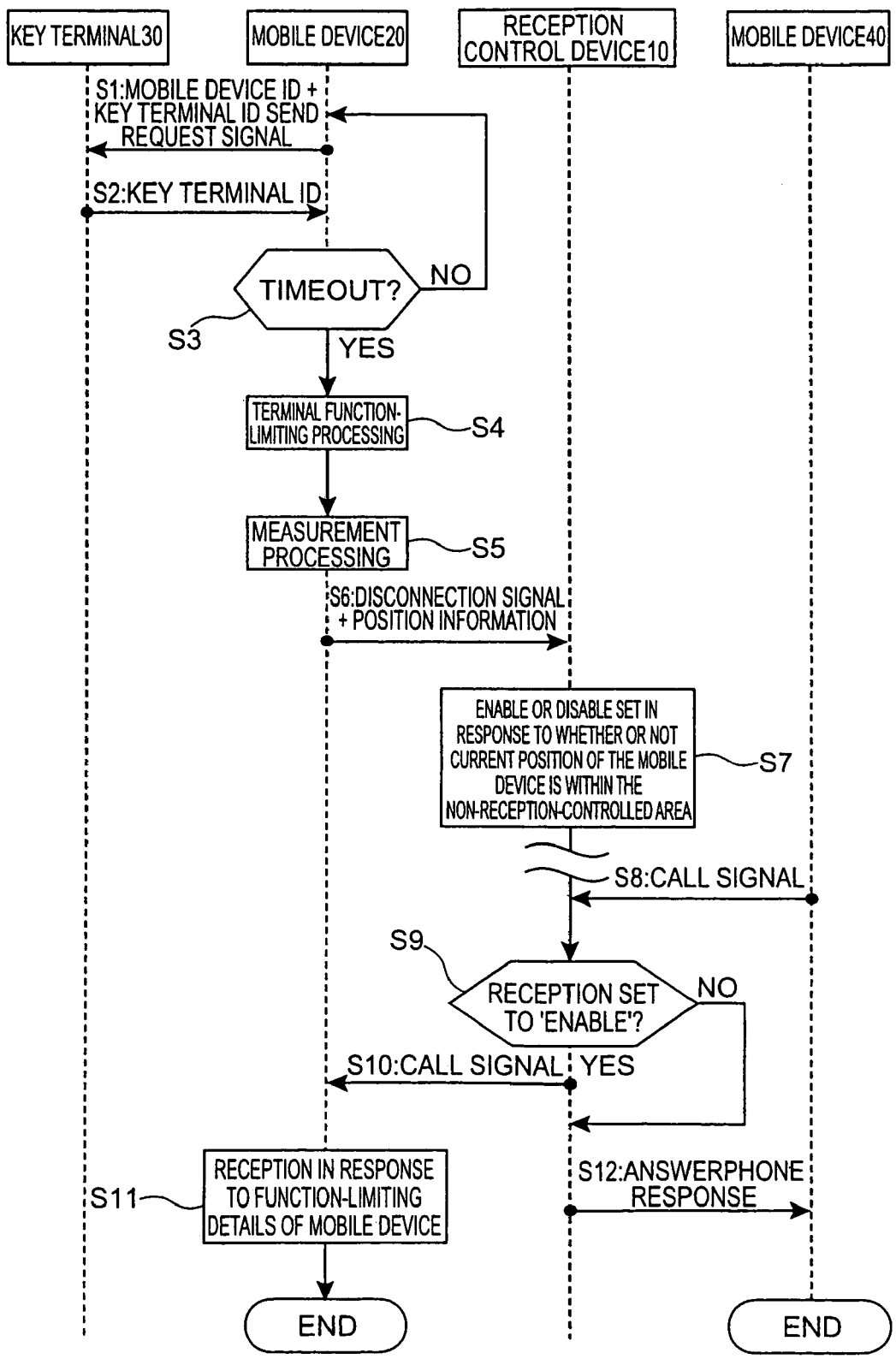
FIG. 3 is a flowchart describing operation of the reception control system of the first embodiment.

Processing to remove the function for reception control commenced in S7 in FIG. 3 is described below. The reception control function can be removed not only from the called mobile device (reception-controlled mobile device), but also from the calling mobile device. FIG. 4(a) is a flowchart describing processing to remove the reception control function from the called mobile device (the mobile device 20 in the present embodiment). The mobile device 20, has a user authentication function, and when a removal instruction is received from a user verified as being a legitimate user with the authentication processing in S21, the terminal function-limiting set in the mobile device 20 is first removed (S22), and the reception control removal signal is then sent from the mobile device 20 to the reception control device reception control device 10 via the base station B1 (S23). The reception control device 10 receiving this signal updates the data in the reception control details registration database 14 with the reception control removal section 16, and thus removes reception control (S24).

FIG. 4(b) is a flowchart describing processing to remove the reception control function from the calling mobile device. The caller is authenticated by the reception control device 10. In other words, when a user other than the user of the mobile device 20 (the user of the mobile device 40) removes reception control for the mobile device 20, the authentication request signal is first sent from the mobile device mobile device 40 to the reception control device 10 (S31). When the reception control device 10 receives the authentication request signal, the user of the mobile device 40 (the source of this signal) is authenticated with the user authentication section user authentication section 17 (S32). When authentication is confirmed, the reception control device 10 updates the data in the reception control details registration database 14 with the reception control removal section 16, and thus removes reception control (S33).

As described above, the reception control device 10 determines whether reception for the mobile device 20 is enabled or disabled in response to whether or not the mobile device 20 is within the non-reception-controlled area. The area in which the mobile device 20 is normally not likely to be stolen or lost (the home and workplace at the company) is registered as the non-reception-controlled area. If, therefore, reception is permitted irrespective of previous reception control details, provided the mobile device 20 is positioned within the non-reception-controlled area, reception is no longer limited more than necessary. As a result, even when the user of the mobile device 20 is no longer aware of its position, it can be readily found with the ring tone and the like. Furthermore, once set, reception control can be removed from either the mobile device 20 or the mobile device 40 provided they have both been authenticated. This removal function is particularly effective when it is necessary to enable reception for the mobile device 20 positioned within the non-reception-controlled area when, for example, the user of the mobile device 20 is in accommodation outside the home, or when it is lent temporarily to an acquaintance.

Second Embodiment

Figure 5:
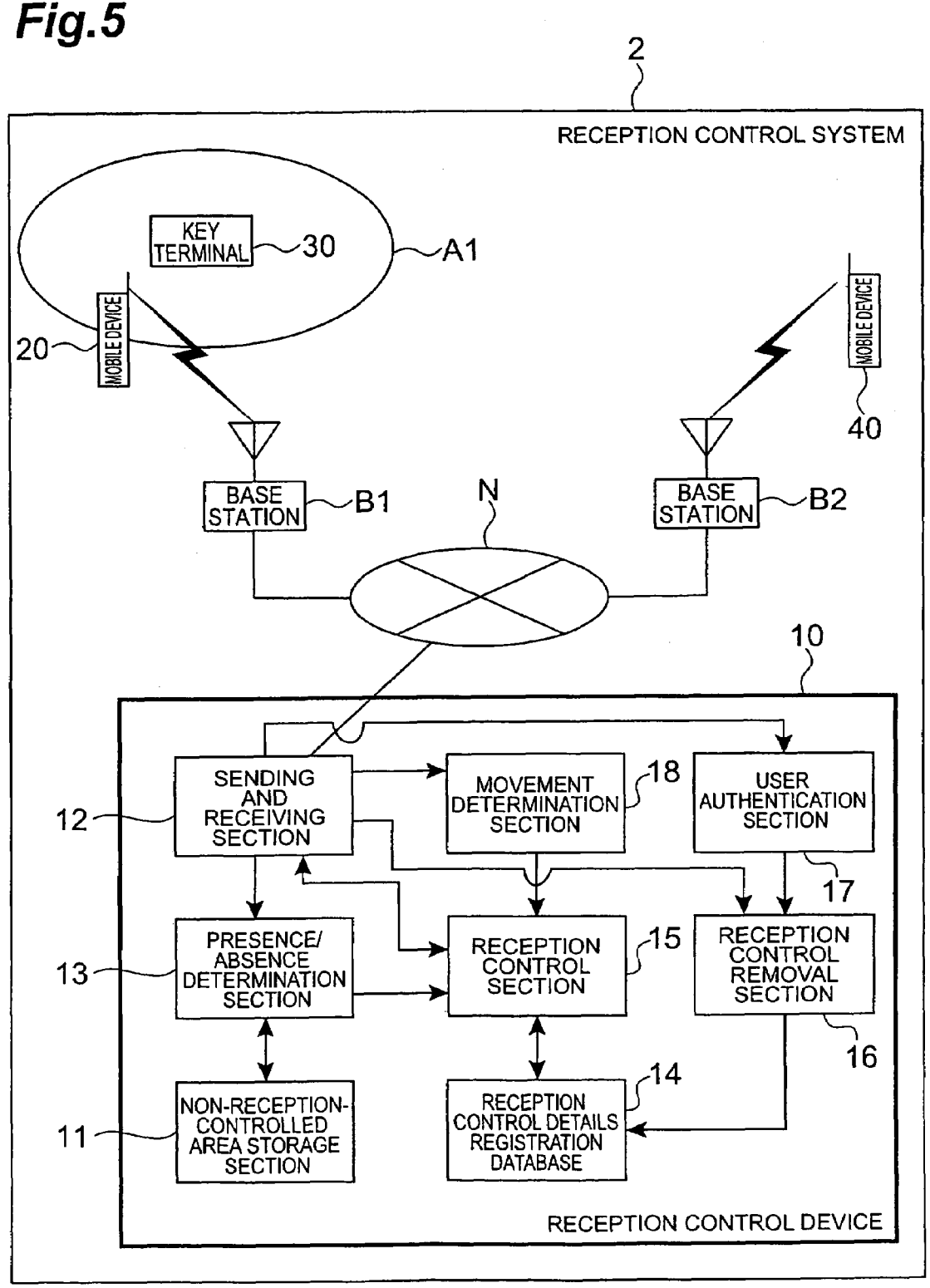
FIG. 5 is a block diagram showing the functional configuration of the reception control device in the second embodiment of the present invention.
Figure 6:
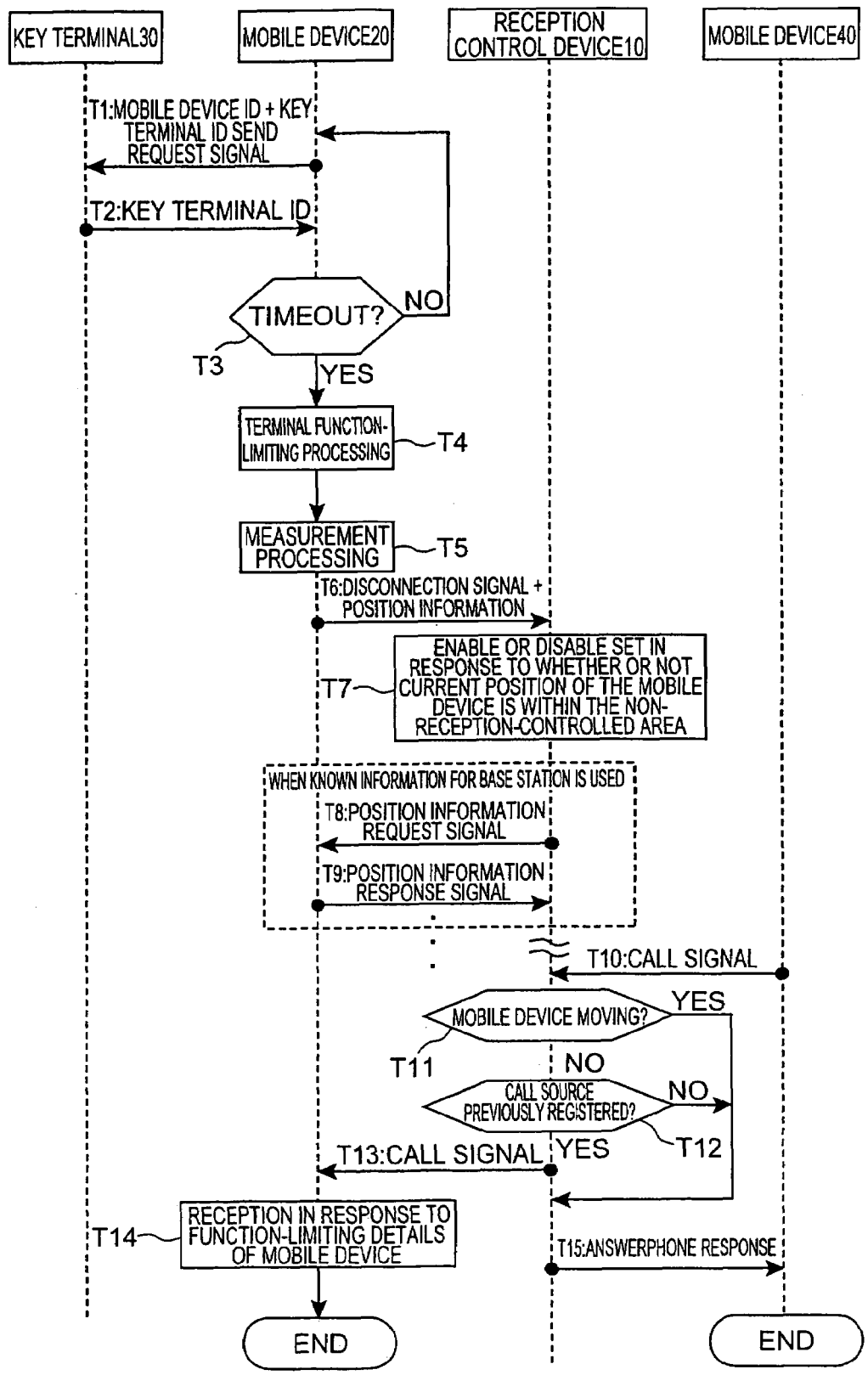
FIG. 6 is a flowchart describing operation of the reception control system of the second embodiment.

The second embodiment of the present invention is described below in reference to FIG. 5 and FIG. 6.

The reception control system in the first embodiment assumes reception control in response to the current position of the mobile device 20 using the separation of the mobile device 20 and the key terminal key terminal 30, however, in the second embodiment, reception control in response to movement status of the mobile device 20 is added. FIG. 5 is a block diagram showing the functional configuration of the reception control device in the second embodiment. Since the configuration of the reception control device resembles the configuration of the reception control device 10 described in detail in the first embodiment, the same symbols are applied to common elements of the configurations, and descriptions omitted. Differences with the first embodiment are described in detail.

In addition to the functions of the reception control section 15 in the first embodiment, the reception control section 15 (corresponding to the function-limiting means) has a function to enable or disable reception in response to movement status. In practice, the reception control section 15 disables all reception for the mobile device determined as moving. On the other hand, only calls from the call source for which the phone number and e-mail address have been previously registered are permitted for mobile devices determined to be stationary.

The movement determination section 18 (corresponding to the movement determining means) determines whether or not the mobile device is moving based on changes over time in position information indicating position received with the sending and receiving section 12. In other words, when the position information for the mobile device 20 changes with each reception time, the movement determination section 18 determines the mobile device 20 as moving, and notifies the reception control section 15 of this fact. On the other hand, when the position information for the mobile device 20 remains unchanged with each reception time, the mobile device 20 is determined as being stationary, and the reception control section 15 is notified of this fact. Position information measured with GPS by the mobile device 20, as well as registered position information normally used for audio communications and acquired from a base station, can be used as the aforementioned position information.

Reception control processing in the second embodiment is described below in reference to FIG. 6. The present reception control processing is fundamentally similar to reception control processing described in detail in the first embodiment (see FIG. 3). In practice, T1 through T7 in FIG. 6 are equivalent to S1 through S7 in FIG. 3. Furthermore, T13 through T15 in FIG. 6 are equivalent to S10 through S12 in FIG. 3.

T8 through T12 differing from FIG. 3 are described below. Firstly, processing in T8 and T9 is executed as necessary for the reception control device 10 to determine the current position of the mobile device 20. In other words, the reception control device 10 uses the movement determination section 18 to determine the movement status of the reception-controlled mobile device 20, however, position information acquired by other means can also be used in this determination in addition to GPS position information received in T6.

For example, the ID of the base station B1 included in known information normally sent from the base station B1 may also be used as mobile device 20 position information. In this case, the reception control device 10 sends the position information send request signal to the mobile device 20 (T8), and the mobile device 20 responds with the position information acquired from the base station B1 via the known information (T9). Thus, when the ID of the base station B1 is used as position information for the mobile device 20, measurement accuracy is less than with position information acquired with a GPS system, however, there is no longer any necessity to include a GPS function in the mobile device 20, and the mobile device 20 can therefore be simply configured.

When the call signal is sent from the mobile device 40 to the mobile device 20 (T10), the reception control device 10 uses the movement determination section 18 to determine the movement status based on whether or not there is a change in the position information (T11). In other words, since reception processing of position information in T6 or T9 is continuously executed at the prescribed interval, the movement determination section 18 can determine whether or not the mobile device 20 is moving by comparing position information received at different times. When position information received at a plurality of times mutually differs, the movement determination section 18 determines that the mobile device 20 is moving (T11:YES), processing in T12 through T13 is omitted, and processing moves to T15.

On the other hand, when position information received at a plurality of times does not differ, the movement determination section 18 determines that the mobile device 20 is stationary (T11:NO), and processing moves to T12. In T12, the movement determination section 18 notifies the reception control section 15 that the mobile device 20 is stationary. The reception control section 15 receiving this notification references the reception control details registration database 14 and determines whether or not the source of the call signal is a previously registered source (T12). When the source of the call signal has been previously registered for reception (T12:YES), the reception control device 10 conducts the normal reception processing for this call signal, and executes the processing in T13 and later. On the other hand, when the source of the call signal has not been previously registered for reception (T12:NO), the reception control device 10 disables reception by the mobile device 20 from this source (T15).

The processing to remove reception control from the mobile device 20 and the mobile device 40 described in the first embodiment in reference to FIG. 4(a) and FIG. 4(b) can naturally be applied to the reception control system 2 in the second embodiment.

As described above, the reception control device 10 determines whether reception for the mobile device 20 is enabled or disabled in response to whether or not the mobile device 20 is moving. In other words, when the mobile device 20 sends a disconnection signal, and is stationary, since the mobile device 20 is moving despite being separated from the user, there is a high probability that it is has been stolen and is being carried by the thief. In order to prevent unauthorized use and theft of data of the mobile device 20, it is therefore desirable that all reception for the mobile device 20 be denied. On the other hand, when the mobile device 20 sends a disconnection signal, and is stationary, since the mobile device 20 is separated from the user and stationary, there is a high probability that it is has been lost (including being left behind). Thus, disabling all reception from the mobile device 20 user and other legitimate users may interfere with its early discovery, and is therefore not desirable. Convenience is therefore ensured by permitting transmission to the mobile device 20 by specific users previously registered.

The present invention is not limited to the aforementioned embodiments, and appropriate variations can be employed provided they do not deviate from the spirit or scope of the invention.

For example, in the aforementioned embodiments, the key terminal 30 sends the key terminal ID in response to a request from the mobile device 20, however, a configuration in which the key terminal 30 sends its own ID autonomously and periodically may be adopted.

By using such a key terminal 30, the need for the mobile device 20 to periodically send its own ID and the key terminal 30 ID send request to the key terminal 30 is eliminated, and processing load is reduced.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A function-limiting device, comprising:
   receiving means to receive a signal sent from a mobile device when signals sent from a communications terminal are not received within a prescribed time, wherein said signal sent from the mobile device to the receiving means is a disconnection signal notifying interruption of communications with the communication terminal; and
   function-limiting means to limit functions related to the mobile device when the signal is received by the receiving means;
   the receiving means configured to receive position information indicating the current position of the mobile device together with said disconnection signal; and
   movement determining means to determine whether or not the mobile device is moving, based on changes over time in the position information received by the receiving means,
   wherein, when the movement determining means determines that the mobile device is moving, the function-limiting means disables all reception for the mobile device, and when the mobile device is determined to be stationary, the function-limiting means enables only reception for the mobile device from a previously registered call source.

2. The function-limiting device according to claim 1, further comprising:
   storing means to store an area where reception is not controlled for the mobile device even when signals sent from the communications terminal are not received within the prescribed time in association with identification information of the mobile device;
   the function-limiting device further comprises presence/absence determining means to determine whether or not the current position indicated by the position information received by the receiving means is within the area previously stored in the storing means, when reception for the mobile device is detected;
   and when the presence/absence determining means determines that the current position is within the area, the function-limiting means enables reception for the mobile device, and when the presence/absence determining means determines that the current position is outside the area, the function-limiting means disables reception for the mobile device.

3. The function-limiting device according to claim 1, further comprising:
   authenticating means to authenticate the mobile device when a signal to remove function-limitation sent from another mobile device is received; and
   removing means to remove function-limitation related to the mobile device when a signal to remove function-limitation sent from the mobile device is received, or when a signal to remove function-limitation sent from the other mobile device is received and the authentication processing for the mobile device has been performed by the authenticating means.

4. A function-limiting method, comprising the steps of:

receiving a signal sent from a mobile device when signals sent from a communications terminal are not received within a prescribed time, wherein said signal sent from the mobile device to the receiving means is a disconnection signal notifying interruption of communications with the communication terminal;

limiting functions related to the mobile device when the signal is received in the receiving step;

receiving position information indicating the current position of the mobile device together with said disconnection signal; and determining whether or not the mobile device is moving, based on changes over time in the received position information;

wherein, when it is determined that the mobile device is moving, all reception for the mobile device is disabled, and when the mobile device is determined to be stationary, reception for the mobile device is enabled only from a previously registered call source.

5. A function-limiting device, comprising:

a receiver configured to receive a signal sent from a mobile device when signals sent from a communications terminal are not received within a prescribed time, wherein said signal sent from the mobile device to the receiver is a disconnection signal notifying interruption of communications with the communication terminal; and a function-limiting module configured to limit functions related to the mobile device when the signal is received by the receiver;

the receiver receives position information indicating the current position of the mobile device together with a disconnection signal;

a movement determining module configured to determine whether or not the mobile device is moving, based on changes over time in the position information received by the receiver;

wherein, when the movement determining module determines that the mobile device is moving, the function-limiting module disables all reception for the mobile device, and when the mobile device is determined to be stationary, the function-limiting module enables only reception for the mobile device from a previously registered call source.

6. The function-limiting device according to claim 5, further comprising:

a memory configured to store an area where reception is not controlled for the mobile device even when signals sent from the communications terminal are not received within the prescribed time in association with identification information of the mobile device;

the function-limiting module further comprising a presence/absence determining module configured to determine whether or not the current position indicated by the position information received by the receiver is within the area previously stored in the memory, when reception for the mobile device is detected;

and when the presence/absence determining module determines that the current position is within the area, the function-limiting module enables reception for the mobile device, and when the presence/absence determining module determines that the current position is outside the area, the function-limiting module disables reception for the mobile device.

* * * * *